United States Patent Office 2,699,458
Patented Jan. 11, 1955

2,699,458

POROUS SINTERED METAL BODIES FOR A STORAGE BATTERY

Leo Schlecht, Ludwigshafen (Rhine), and Ernst Oestreicher, Ludwigshafen (Rhine-Oppau), Germany, assignors to Badische Anilin- & Soda-Fabrik Aktiengesellschaft, Ludwigshafen am Rhine, Germany No Drawing. Application March 9, 1951, Serial No. 214,826

Claims priority, application Germany May 11, 1950

6 Claims. (Cl. 136—28)

This invention relates to the production of porous shaped articles of nickel-iron, which are very suitable for example as electrodes for accumulators.

Porous bodies of the said kind can be prepared by heating a mixture of nickel powder and iron powder to sintering temperature. It is difficult, however, to obtain sintered bodies with a high pore volume because when the two metal powders are mixed the piled weight is increased and consequently the pore volume of the sintered body is reduced. It has therefore already been proposed to add to the nickel powder, not iron powder but very light iron oxide, as for example that obtained by combustion of iron carbonyl, and to employ reducing conditions during the working up into sintered articles so that pores are formed at those places at which the oxygen was present. It is difficult also by this method, however, to obtain high pore volumes, as for example those of 85% and more, such as are desirable in electrode porous bodies for accumulators. Apart from this, electrode plates produced by this method show a tendency to tear.

We have now found that porous sintered bodies consisting of nickel-iron and having a high pore volume can be obtained by employing nickel-iron powder which has been prepared by thermal decomposition of a mixture of the corresponding metal carbonyls and which has a piled weight of less than 2 kilograms per litre.

It is known that highly porous sintered nickel bodies can be obtained by subjecting nickel powder prepared from nickel carbonyl and having a piled weight of less than 2 kilograms per litre to a heat treatment. It has been found that porous sintered iron bodies can be prepared in a similar manner from a light iron powder prepared from iron carbonyl. Contrary to expectation, however, it has been found that from a mixture of a light nickel powder obtained from nickel carbonyl and a light iron powder obtained from iron carbonyl it is only with difficulty that a porous, homogeneously composed ironnickel sintered body can be obtained, probably because the light spongy particles of nickel powder only become associated with the light iron powder particles by mechanical mixing when they have been subjected to this treatment for a long period. This prolonged treatment, however, results in such a marked increase in the piled weight of the powder mixture that the desired high porosity is no longer obtained upon sintering. On the other hand if the powders are mixed for only a short time in the usual way in a mill, such a long heat treatment is necessary in the subsequent sintering to produce a homogeneous iron-nickel alloy by diffusion that a considerable shrinkage and reduction of the pore volume takes place.

In contradistinction thereto an intimate mixture of the nickel and iron powder particles and at the same time a low piled weight of the powder are obtained by subjecting a mixture of iron carbonyl and nickel carbonyl per se—decomposition in the free space of a heated vessel so that a nickel-iron powder is formed. In this product within a spongy secondary particle there are probably present a primary iron particle and a primary nickel particle so that for complete formation of a nickel-iron alloy the heat treatment for diffusion need only be short and consequently a high pore volume of the nickel-iron sintered article is obtainable.

In the same way, instead of a mixture of nickel carbonyl and iron carbonyl, other carbonyl mixtures, as for example mixtures of iron carbonyl or nickel carbonyl with cobalt carbonyl or molybdenum carbonyl, or of cobalt carbonyl with molybdenum carbonyl, may be used and the resulting metal powder mixture worked up, whereby porous sintered bodies of alloys of the metals corresponding to the said carbonyls are obtained.

The shaped articles of alloys thus produced may be used for many purposes. Porous bands or plates of nickel-iron for example are well suited as electrode bodies for alkaline accumulators. Porous plates or porous cylinders from the light metal powder mixtures, as for example from nickel-molybdenum powder, may be used as filter devices in the chemical industry for purifying strongly-corrosive liquids. The porous metal alloys may also be used with advantage as catalysts by reason of their large surface.

The following example will further illustrate this invention but the invention is not limited to this example. The parts are by weight.

Example

A vaporous mixture of 50 parts of iron carbonyl and 50 parts of nickel carbonyl has added to it about 10 per cent of its volume of carbon monoxide and is then led through the free space of a heated vessel whereby it is decomposed into a nickel-iron powder having a piled weight of 1.5 kilograms per litre. This powder is sintered in a current of hydrogen at about 900° C. to form a porous band about 1 millimetre in thickness. The nickel-iron band obtained has a pore volume of 85 per cent. It is mechanically compacted by local pressure treatment by which a lattice is formed. Cadmium hydroxide is then introduced in known manner into the pores of the band, and there is thus obtained a negative electrode for alkaline accumulators having a high mechanical strength and which can be discharged at high current strength by reason of its low internal resistance.

If nickel hydroxide is introduced into the pores instead of cadmium hydroxide, a positive electrode is obtained.

What we claim is:

1. A process for the production of a porous carrier body for an electrode for an alkaline storage battery comprising the steps of thermally decomposing a vaporous mixture of metal carbonyls to produce a metallic powder consisting essentially of an intimate mixture of the metals having a piled weight of less than 2 kilograms per liter, and sintering the mixture in the desired shape of the carrier body in a hydrogen atmosphere to produce a porous metal alloy carrier body.

2. A process for the production of a porous carrier body for an electrode for an alkaline storage battery comprising the steps of thermally decomposing a vaporous mixture of nickel carbonyl and iron carbonyl to produce a metallic powder consisting essentially of an intimate mixture of nickel and iron having a piled weight of less than 2 kilograms per liter, and sintering the mixture in the desired shape of the carrier body in a hydrogen atmosphere to produce a porous nickel-iron alloy carrier body.

3. A porous carrier body for an electrode for an alkaline storage battery characterized by high mechanical strength and high pore volume and produced by the process of claim 1.

4. A porous carrier body for an electrode for an alkaline storage battery characterized by high mechanical strength and high pore volume and produced by the process of claim 2.

5. A porous electrode for an alkaline storage battery characterized by high mechanical strength and high pore volume produced by the process of claim 1 and containing an active electrode material in the pores thereof.

6. A porous electrode for an alkaline storage battery characterized by high mechanical strength and high pore volume produced by the process of claim 2 and containing an active electrode material in the pores thereof.

(References on following page)

References Cited in the file of this patent

UNITED STATES PATENTS

| Number | Name | Date |
|---|---|---|
| 1,506,246 | MacMahon | Aug. 26, 1924 |
| 2,159,231 | Schlecht et al. | May 23, 1939 |
| 2,159,604 | Schlecht et al. | May 23, 1939 |
| 2,198,042 | Schlecht et al. | Apr. 23, 1940 |

FOREIGN PATENTS

| Number | Country | Date |
|---|---|---|
| 423,823 | Great Britain | Feb. 8, 1935 |